(12) United States Patent
Sandhar et al.

(10) Patent No.: US 11,787,162 B2
(45) Date of Patent: Oct. 17, 2023

(54) ROOFING UNDERLAYMENT

(71) Applicant: FT SYNTHETICS INC., Langley City (CA)

(72) Inventors: Gurpreet S. Sandhar, Langley City (CA); Kenneth Russell Robson, Langley City (CA); Sahar Khedri, Langley City (CA)

(73) Assignee: FT Synthetics Inc., Langley City (CA)

( * ) Notice: Subject to any disclaimer, the term of this patent is extended or adjusted under 35 U.S.C. 154(b) by 112 days.

(21) Appl. No.: 17/297,856

(22) PCT Filed: Nov. 29, 2018

(86) PCT No.: PCT/CA2018/051526
§ 371 (c)(1),
(2) Date: May 27, 2021

(87) PCT Pub. No.: WO2020/107094
PCT Pub. Date: Jun. 4, 2020

(65) Prior Publication Data
US 2022/0016876 A1 Jan. 20, 2022

(51) Int. Cl.
B32B 27/12 (2006.01)
B32B 5/02 (2006.01)
(Continued)

(52) U.S. Cl.
CPC .............. *B32B 27/12* (2013.01); *B32B 5/022* (2013.01); *B32B 7/12* (2013.01); *B32B 27/20* (2013.01);
(Continued)

(58) Field of Classification Search
CPC .. B32B 3/263; B32B 3/02; B32B 3/26; B32B 3/30; B32B 17/10036; B32B 17/10045;
(Continued)

(56) References Cited

U.S. PATENT DOCUMENTS 5,728,451 A * 3/1998 Langley ............ B29C 66/73921
156/290
8,309,211 B2 11/2012 Mehta et al.
(Continued)

FOREIGN PATENT DOCUMENTS

| EP | 0167714 A2 | 1/1986 |
| EP | 0708212 B1 | 5/2000 |
| WO | 1997/30244 A2 | 8/1997 |

OTHER PUBLICATIONS

International Search Report and Written Opinion for corresponding International Application No. PCT/CA2018/051526 dated Aug. 13, 2019.

(Continued)

*Primary Examiner* — Maria V Ewald
*Assistant Examiner* — Ethan Weydemeyer
(74) *Attorney, Agent, or Firm* — GREENBERG TRAURIG, LLP

(57) ABSTRACT

A breathable synthetic roofing underlayment having a hydrophobic nonwoven layer on top to deflect water, a liquid water-resistant and vapour-permeable membrane layer in the middle, and a bottom nonwoven layer which is hydrophilic and has rapid and high liquid water absorbency. This accelerates the movement of liquid water from a roofing deck into the nonwoven bottom layer and increases the rate of transfer of water through the underlayment. The bottom layer comprises a carrier resin and a hydrophilic agent, which may be a polyamide such as polycaprolactam (Nylon 6) or poly (hexamethylene adipamide), a polysorbate or other composition. The underlayment is especially useful for application to wet roofing decks.

34 Claims, 1 Drawing Sheet

(51) Int. Cl.
    *B32B 27/34*     (2006.01)
    *B32B 27/20*     (2006.01)
    *B32B 27/32*     (2006.01)
    *B32B 7/12*     (2006.01)
    *E04D 12/00*     (2006.01)

(52) U.S. Cl.
    CPC .............. *B32B 27/32* (2013.01); *B32B 27/34* (2013.01); *E04D 12/002* (2013.01); *B32B 2250/03* (2013.01); *B32B 2262/0253* (2013.01); *B32B 2264/0214* (2013.01); *B32B 2264/104* (2013.01); *B32B 2264/1021* (2020.08); *B32B 2264/1023* (2020.08); *B32B 2307/718* (2013.01); *B32B 2307/724* (2013.01); *B32B 2307/728* (2013.01); *B32B 2307/7265* (2013.01); *B32B 2307/73* (2013.01); *B32B 2307/732* (2013.01); *B32B 2419/06* (2013.01)

(58) Field of Classification Search
    CPC ......... B32B 17/10119; B32B 17/10137; B32B 2315/08; B32B 2329/04; B32B 2329/06; B32B 2251/00; B32B 2571/00; B32B 2605/006; B32B 2264/1023; B32B 2264/1021; B32B 2264/0214; B32B 2264/104; B32B 2307/03; B32B 2307/718; B32B 2307/724; B32B 2307/7265; B32B 2307/728; B32B 2307/73; B32B 2307/732; B32B 2419/06; C03B 17/064; C03B 18/02; C03B 23/023; C03B 3/083; C03B 3/087; C03B 3/093; C03B 21/002; E04D 12/002

See application file for complete search history.

(56) References Cited

U.S. PATENT DOCUMENTS

| | | | |
|---|---|---|---|
| 2003/0194566 A1 | 10/2003 | Corzani et al. | |
| 2004/0023585 A1* | 2/2004 | Carroll | B32B 27/32 442/389 |
| 2012/0219781 A1* | 8/2012 | Babin | B29C 48/25 428/220 |
| 2016/0333213 A1* | 11/2016 | Zhou | C09D 133/04 |
| 2022/0364367 A1 | 11/2022 | Carr et al. | |

OTHER PUBLICATIONS

Breathex document, website www.breathex.com accessed Sep. 24, 2018.

* cited by examiner

ROOFING UNDERLAYMENT

CROSS-REFERENCE TO RELATED APPLICATIONS

This application is a National Stage application of International Application No. PCT/CA2018/051526, filed on Nov. 29, 2018 entitled "ROOFING UNDERLAYMENT," the entirety of which is incorporated by reference herein.

FIELD OF THE INVENTION

The present invention pertains to roofing underlayments, in particular to multilayer underlayments that may be used on wet roofing deck surfaces.

BACKGROUND OF THE INVENTION

Roofing underlayments are fabrics that are installed directly onto roofing decks, prior to the installation of shingles or other exterior roofing materials. Depending upon weather conditions at the time of installation, the roof deck may be wet and the underlayment is applied to the wet deck. This is a common but problematic building practice, as mold growth or deck rot may occur if the deck remains wet for a sufficient period of time after the installation of the underlayment.

Conventional underlayment products do not adequately address this problem. Felt paper underlayment has low breathability and low water absorbency. If it becomes wet, it tends to buckle after drying and does not maintain its structure. There are synthetic underlayment products on the market that have breathability, meaning that they allow water vapour and air to pass through them. This feature is important in allowing water vapour inside a building to escape, since trapped water vapour can lead to damage over time. However, these breathable synthetic underlayments are typically manufactured using porous nonwoven substrates which allow for the transport of water vapour but exhibit poor liquid water absorption. This is due to the use of polymers, for example polyolefins, which are non-polar and have hydrophobic surface properties, and as a result the fibrous nonwoven structure is highly resistant to the absorption of liquid water. While this property is effective for the top surface of a roofing underlayment it is not ideal for the layer in contact with the roof deck. A wet deck having liquid water on it does not dry efficiently after the application of such synthetic underlayments or conventional felt paper.

One synthetic underlayment product, Breathex (marketed by HAL Industries Inc. of Surrey, Canada), is a two-layer synthetic underlayment comprising a hydrophobic fabric top layer laminated with a water-resistant and breathable coating bottom layer in contact with the roof deck. The bottom layer, while vapour permeable, does not have a structure that will effectively absorb liquid water. Another product, Deck-Armor (marketed by GAF), is a three-layer product consisting of a top nonwoven layer with a second breathable and water-resistant middle layer between the two nonwoven layers, and a bottom nonwoven layer in contact with the roof deck. The two nonwoven layers of the product do not easily absorb liquid water. There is no synthetic underlayment product currently available that can quickly absorb and wick moisture from the roofing deck and breathe it to the outside to dry the deck within a time frame such that mold will not grow into the deck. High breathability is not sufficient to deal with the problem of liquid water on a roofing deck.

There remains a need in the roofing industry for a roofing underlayment that has good mechanical properties and can be applied to wet roofing decks, which quickly absorbs liquid water from the surface of the roof deck, thereby helping to prevent mold growth and increasing the rate of transfer of liquid water from the deck.

SUMMARY OF THE INVENTION

The invention provides a breathable synthetic roofing underlayment having a hydrophobic nonwoven layer on top to deflect water, a liquid water-resistant and vapour-permeable (breathable) membrane layer in the middle, and a bottom nonwoven layer which is modified, relative to the bottom layer of prior art underlayments, to be hydrophilic and exhibit rapid and high liquid water absorbency, thereby accelerating the movement of liquid water from a wet deck into the nonwoven bottom layer and increasing the rate of transfer of water through the underlayment. A typical bottom layer of prior art underlayments does not absorb liquid water, and therefore the water has to move through the thickness of the bottom layer as a vapour, which reduces the overall vapour permeability of the underlayment. Modifying the underlayment bottom layer to quickly absorb liquid water from the roofing deck reduces the resistance to overall breathability, since the water quickly moves through the bottom layer as a liquid and not slowly as a vapour. In addition, the high absorbency and wicking properties of the bottom layer can potentially spread localized areas of water on the roof deck over a large surface area, thereby further increasing the transport of water vapour through the middle layer, which is a liquid water-resistant and vapour-permeable membrane, and through the breathable nonwoven top layer.

The underlayment of the invention can be used in all working conditions, especially on wet decks. It also improves the drying ability of a roof in cases of poor ventilation in the roof due to complex roof designs or poor workmanship, for example, where venting ducts are not installed properly, since it has high permeability to water vapour.

One aspect of the invention provides a roofing underlayment comprising: (a) a first layer that is breathable and nonwoven comprising a thermoplastic polymer or mixture of polymers, the first layer having a hydrophobic surface and low liquid water absorptive capacity, the first layer being an outer layer for contact with shingles or other exterior roofing material; (b) a second layer that is a liquid water barrier and is vapour-permeable, comprising a carrier resin and a breathability agent; and (c) a third layer that is breathable and nonwoven for contact with a roofing deck, the third layer being hydrophilic and with rapid and high liquid water absorptive capacity, the second layer being between the third layer and the first layer and laminating them together.

According to another aspect of the invention, the third layer of the roofing underlayment comprises a carrier resin and a hydrophilic agent. The hydrophilic agent may comprise a polyamide, such as polycaprolactam (Nylon 6) or poly(hexamethylene adipamide); or a polysorbate, such as polyoxyethylene (20) sorbitan monooleate (polysorbate 80) and polyoxyethylene (20) sorbitan monolaurate (polysorbate 20); or a mixture of polyethylene, polypropylene, wax and polyacrylamide; or silica-alumina.

Further aspects of the invention and features of specific embodiments of the invention are described below.

DETAILED DESCRIPTION

Figure 1:
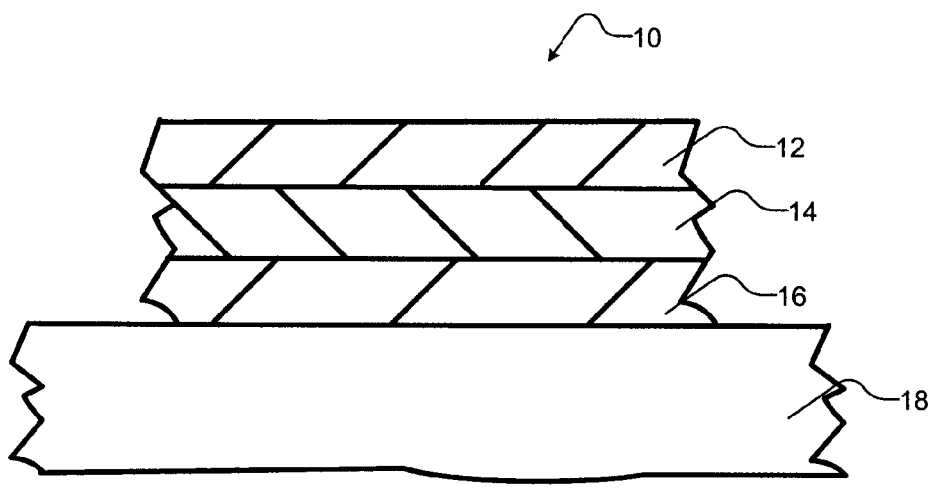
FIG. 1 is a schematic cross-sectional view of an embodiment of the roofing underlayment of the invention on a roofing deck.

Referring to FIG. 1, the underlayment 10 is a fabric having three layers, namely, a top layer 12, a middle layer 14, and a bottom layer 16. In use, the bottom layer 16 is in contact with the roofing deck 18, and the top layer 12 is opposite to the roofing deck 18 and would have roofing shingles or other exterior roofing material applied directly to it.

The top layer 12 is a hydrophobic, non-woven, thermoplastic polyolefin sheet. It comprises 35 to 40 percent of the product weight. Suitable polyolefin resins include polyethylene and polypropylene. Mixtures of such resins may also be used.

The middle layer 14 is a, breathable, thermoplastic, liquid water-resistant film. It laminates the top and bottom layers to each other. The middle layer comprises from 25 to 70 weight percent of a carrier resin, and from 30 to 75 weight percent of a breathability agent. The carrier resin is a polyolefin, for example, polyethylene or polypropylene. The breathability agent may be polyether block amide (PEBA), for example PEBAX (marketed by Arkema). In some embodiments, the breathability agent is a polyolefin with calcium carbonate filler. The middle layer comprises 10 to 15 percent of the product weight.

The bottom layer 16 is a hydrophilic, non-woven sheet made from fibers formed from a blend of thermoplastic resin and a hydrophilic agent, resulting in rapid and high liquid water absorbency characteristics for the bottom layer. The bottom layer fibers comprise from 90 to 99.9 weight percent of a carrier resin, and from 0.1 to 10 weight percent of a hydrophilic agent, alternatively from 1.0 to 10 weight percent of hydrophilic agent. The carrier resin is a polyolefin, for example, polyethylene or polypropylene. The hydrophilic agent may be a resin that comprises a polyamide, for example polycaprolactam (Nylon 6) and poly(hexamethylene adipamide). Examples of suitable hydrophilic agents include polysorbates, such as polyoxyethylene (20) sorbitan monooleate (polysorbate 80), polyoxyethylene (20) sorbitan monolaurate (polysorbate 20). In some embodiments, the hydrophilic agent of the bottom layer may be one or more hydrophilic agents sold under the trade names SH-04, HYDROSOFT-2036, HYDROSOFT-HPES, HYDROSOFT-PA, POLYFINISH-PU, POLYFINISH-8702, and LEDIGAL-BKS. In some embodiments, the hydrophilic resin comprises a mixture of polypropylene (10 wt. % to 38 wt. %), polyethylene wax (8 wt. % to 25 wt. %) and polyacrylamide (10 wt. % to 45 wt. %), said mixture being marketed under the trade name SH-04. In other embodiments, the hydrophilic agent comprises silica-alumina. The use of fibers formed from a blend of hydrophilic resin and thermoplastic resin in the bottom layer provides higher durability than using a topically applied hydrophilic coating, since a coating is susceptible to being washed off.

In some embodiments, the three layers have the following minimum weights: the top layer 12 is more than 30 g/m$^2$, the middle layer 14 is more than 15 g/m$^2$ and the bottom layer 16 is more than 20 g/m$^2$.

The underlayment 10 is made by forming each of the two nonwoven layers 12, 16 and laminating these two layers together with the water vapour-permeable and liquid water barrier middle layer 14.

The underlayment 10 has a liquid water absorbency of at least 9 grams of water in 1 m$^2$ of sample in 10 min, measured according to the method described in Example 1 below, i.e., using a 10 gram sample in an inverted cup at 23±2° C. In some embodiments, the minimum water absorbency is 20 grams, or 40 grams.

The underlayment 10 has a minimum breathability of at least 10 perms measured according to standard test method ASTM E96. It has a minimum of 70 perms when in contact with water according to ASTM E96-Inverted Cup.

The breathability of the underlayment 10 is up to 30 times higher than the breathability of conventional felt paper and the currently available breathable roofing underlayments when they are in contact with water. This allows a roofing deck, which is typically plywood, to dry much faster.

The underlayment 10 has a surface wettability on its bottom surface consistent with its ability to absorb liquid water quickly. When measured according to standard test method ASTM D724, in some embodiments the contact angle between the surface and water remains constant at less than 105°. In other embodiments, the contact angle decreases to 0° in less than 6 seconds, or in less than 2 seconds.

The underlayment 10 is also suitable for use with metal roofing. If there is any water pond on the metal roofing, existing breathable roofing underlayments may cause rotting of the deck surface or migration of water to the lower level of the roof. In contrast, the present underlayment 10 absorbs all water from the surface of the roof and dries out the metal roof quickly.

Example 1

An underlayment was fabricated according to the invention having 4 wt. % hydrophilic resin (trade name SH-04) in the bottom layer. The absorbency of liquid water into the underlayment and into the prior art products Breathex (HAL Industries), felt paper and Deck-Armor (GAF) was measured after 10 minutes of exposure according to the following method: The test was performed at 23±2° C. The specimen underlayments were conditioned at said temperature for 2±0.1 hour. 10 grams of water was put into a 10 cm diameter cup. A circular sample of the underlayment was cut with a diameter of 10 cm and was weighed. The sample was placed and sealed on top of the cup. The cup was inverted for 10 min at 23° C. and 50% humidity. After 10 min, the sample was removed from the cup and held vertically for 1 min to lose any excess water. The sample was weighed and the weight compared with the initial weight. The amount of absorbed water per square meter was calculated. The results are shown in Table 1.

TABLE 1

| Product | Absorption of water per square meter of underlayment (grams) |
|---|---|
| Underlayment of invention with 4 wt. % hydrophilic resin | 41.35 |
| Breathex | 2.35 |
| Felt paper | 5.87 |
| Deck-Armor | 3.52 |

Example 2

A further test of water absorbency was conducted on each of the four underlayments described in Example 1. Water absorbency was measured according to the following method. The test was conducted at 23±2° C. The specimens were conditioned at said temperature for 2±0.1 h. A circular sample was cut with a 10 cm diameter. 5 grams of water was placed on the sample. The time required for the sample to absorb all the water was measured. It took less than 1 minute for the water to be absorbed into the underlayment of the invention, and more than 24 hours to be absorbed by each of the other three products.

Example 3

Figure 2:
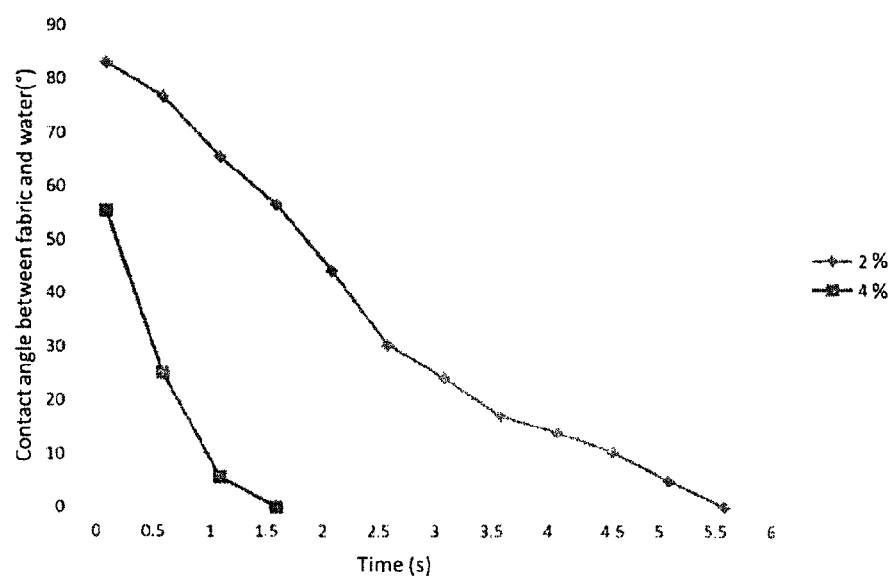
FIG. 2 is a graph of surface wettability measurements for two embodiments of the invention, as described in Example 4.

The permeability of underlayments according to the invention and prior art underlayments was tested, using the inverted cup method at 25° C. according to standard test method ASTM E96. In addition to the four products described in Example 1, tests were done on underlayments according to the invention with 2 wt. % and 1 wt. % hydrophilic resin (trade name SH-04) in the bottom layer, and on the prior art underlayment Hydra (marketed by FT Synthetics Inc. of Surrey, Canada). The results are set out in Table 2 below. A graph of the measurements for the 2 wt. % and 4 wt. % hydrophilic resin compositions of the invention is shown in FIG. 2.

The surface wettability of the products described in Example 3 was measured. 4 μL of water was put on the back side of the samples and the contact angle between the fabric and water was measured in accordance with standard test method ASTM D724. The results are set out in Table 2 below.

TABLE 2

| Product | Permeability (perms) (Example 3) | Contact angle over time (Example 4) |
|---|---|---|
| Underlayment of invention with 4 wt. % hydrophilic resin | 335 | Decreased from 55° at time = 0 to 0° at time = 1.5 seconds |
| Underlayment of invention with 2 wt. % hydrophilic resin | 104 | Decreased from 83° at time = 0 to 0° at time = 5.5 seconds |
| Underlayment of invention with 1 wt. % hydrophilic resin | 75 | Constant at 103.4° over 1 hour |
| Hydra | 70 | Constant at 125.8° over 1 hour |
| Felt paper | 18 | Constant at 127.6° over 1 hour |
| Deck-Armor | 10 | Constant at 128.6° over 1 hour |
| Breathex | 5 | Constant at 132.2° over 1 hour |

Throughout the foregoing description and the drawings, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As will be apparent to those skilled in the art in the light of the foregoing disclosure, many alterations and modifications are possible in the practice of this invention without departing from the scope thereof. Accordingly, the scope of the invention is to be construed in accordance with the following claims.

The invention claimed is:

1. A roofing underlayment comprising:
   (a) a first layer that is nonwoven, vapour-permeable, and has a hydrophobic surface, comprising a polymer or mixture of polymers, the first layer being an outer layer configured to contact an exterior roofing material;
   (b) a second layer that is water vapour-permeable and a liquid water barrier, comprising a carrier resin and a breathability agent, and
   (c) a third layer configured to contact a roofing deck, the third layer being nonwoven, hydrophilic and liquid water absorptive,
   wherein the second layer between the third layer and the first layer;
   wherein the third layer comprises a carrier resin and a hydrophilic agent;
   wherein the carrier resin comprises a polyolefin;
   wherein the hydrophilic agent comprises between 2 and 10 weight % of the third layer;
   wherein the roofing underlayment has a water absorbency of at least 9 g/m$^2$ in 10 minutes; and
   wherein the roofing underlayment has a breathability of at least 10 perms when measured in accordance with standard test method ASTM E96; and
   wherein the roofing underlayment has a surface wettability on its bottom surface such that a contact angle between the bottom surface and water decreases to 0° in less than 6 seconds, measured in accordance with standard test method ASTM D724.

2. A roofing underlayment according to claim 1, wherein the water absorbency is at least 20 g/m$^2$ in 10 minutes.

3. A roofing underlayment according to claim 1, wherein the water absorbency is least 40 g/m$^2$ in 10 minutes.

4. A roofing underlayment according to claim 1, wherein surface wettability is such that the contact angle decreases to 0° in less than 2 seconds, measured in accordance with standard test method ASTM D724.

5. A roofing underlayment according to claim 1, wherein the breathability is at least 70 perms.

6. A roofing underlayment according to claim 1, wherein the hydrophilic agent comprises a polyamide.

7. A roofing underlayment according to claim 6, wherein the polyamide comprises polycaprolactam (Nylon 6).

8. A roofing underlayment according to claim 6, wherein the polyamide comprises poly(hexamethylene adipamide).

9. A roofing underlayment according to claim 1, wherein the hydrophilic agent comprises a polysorbate.

10. A roofing underlayment according to claim 9, wherein the polysorbate comprises polyoxyethylene (20) sorbitan monooleate (polysorbate 80).

11. A roofing underlayment according to claim 9, wherein the polysorbate comprises polyoxyethylene (20) sorbitan monolaurate (polysorbate 20).

12. A roofing underlayment according to claim 1, wherein the hydrophilic agent comprises a mixture of polyethylene, polypropylene, wax and polyacrylamide.

13. A roofing underlayment according to claim 1, wherein the hydrophilic agent comprises silica-alumina.

14. A roofing underlayment according to claim 1, wherein the hydrophilic agent comprises at least 4 weight % of the third layer.

15. A roofing underlayment according to claim 1, wherein the carrier resin of the third layer comprises a polyolefin.

16. A roofing underlayment according to claim 8, wherein the polyolefin comprises polyethylene, polypropylene, or both.

17. A roofing underlayment according to claim 1, wherein the third layer has a weight of more than 20 g/m³.

18. A roofing underlayment according to claim 1, wherein the carrier resin comprises from 90 to 98 weight percent of the third layer.

19. A roofing underlayment according to claim 1, wherein the polymer of the first layer comprises a polyolefin.

20. A roofing underlayment according to claim 19, wherein the polyolefin of the first layer comprises polyethylene, polypropylene or both.

21. A roofing underlayment according to claim 1, wherein the first layer comprises from 35% to 40% of the underlayment weight.

22. A roofing underlayment according to claim 1, wherein the breathability agent of the second layer comprises polyether block amide.

23. A roofing underlayment according to claim 1, wherein the breathability agent of the second layer is a polyolefin with calcium carbonate filler.

24. A roofing underlayment according to claim 1, wherein the carrier resin of the second layer comprises a polyolefin.

25. A roofing underlayment according to claim 24, wherein the polyolefin of the second layer comprises polyethylene, polypropylene, or both.

26. A roofing underlayment according to claim 1, wherein the carrier resin of the second layer comprises from 20 to 70 weight % of the second layer.

27. A roofing underlayment according to claim 1, wherein the breathability agent of the second layer comprises from 30 to 75 weight % of the second layer.

28. A roofing underlayment according to claim 1, wherein the second layer comprises from 10 to 15% of the underlayment weight.

29. A roofing underlayment according to claim 1, wherein the second layer bonds the first layer to the third layer.

30. A roofing underlayment according to claim 1, wherein the underlayment has a thickness in the range of 10-30 mils.

31. A roofing underlayment according to claim 1, wherein the underlayment has a weight in the range of 100-300 g per square meter.

32. A roofing system comprising:
   a roof deck;
   a roofing material; and
   a roofing underlayment comprising:
      (a) a nonwoven first layer comprising at least one polymer, the first layer in contact with the roofing material;
      (b) a second layer comprising a carrier resin and a breathability agent, the second layer in contact with the first layer; and
      (c) a nonwoven third layer comprising a carrier resin and a hydrophilic agent, the third layer in contact with the second layer and the roof deck;
         wherein the hydrophilic agent comprises between 2 and 10 weight % of the third layer;
      wherein the roofing underlayment has a water absorbency of at least 9 g/m² in 10 minutes; and
      wherein the roofing underlayment has a breathability of at least 10 perms when measured in accordance with standard test method ASTM E96; and
      wherein the roofing underlayment has a surface wettability on its bottom surface such that a contact angle between the bottom surface and water decreases to 0° in less than six seconds, measured in accordance with standard test method ASTM D724.

33. A roofing system according to claim 32, wherein the at least one polymer of the first layer comprises a polyolefin that comprises a thermoplastic resin.

34. A roofing system according to claim 32, wherein the carrier resin of the third layer comprises polyethylene or polypropylene.

* * * * *